United States Patent [19]

Ichinowatari

[11] Patent Number: 5,973,790
[45] Date of Patent: Oct. 26, 1999

[54] FACSIMILE MACHINE

[75] Inventor: Yasuo Ichinowatari, Tokyo, Japan

[73] Assignee: Oki Data Corporation, Tokyo, Japan

[21] Appl. No.: 08/842,793

[22] Filed: Apr. 16, 1997

[30] Foreign Application Priority Data

Apr. 16, 1996 [JP] Japan .................................. 8-093874

[51] Int. Cl.$^6$ .................................................. H04N 1/00
[52] U.S. Cl. ...................................... 358/402; 358/434
[58] Field of Search .................................. 358/434, 402, 358/468; 395/200.49

[56] References Cited

U.S. PATENT DOCUMENTS

| 4,811,385 | 3/1989 | Watanabe | 379/100.09 |
| 5,091,790 | 2/1992 | Silverberg | 358/434 |
| 5,291,546 | 3/1994 | Giler et al. | 358/402 |
| 5,414,837 | 5/1995 | Kotatsu | 395/200.49 |
| 5,552,901 | 9/1996 | Kikuchi et al. | 358/468 |

FOREIGN PATENT DOCUMENTS 4-165754  6/1992  Japan .

Primary Examiner—Joseph Mancuso
Assistant Examiner—Vikkram Bali
Attorney, Agent, or Firm—Rabin & Champagne, P.C

[57] ABSTRACT

A facsimile machine has an image memory for storing image data while a host device cannot receive the image data from the telephone line. When the host device becomes able to receive data, the facsimile machine starts transmitting the stored image data to the host device. The host device can later process the received image data.

2 Claims, 4 Drawing Sheets

FACSIMILE MACHINE

BACKGROUND OF THE INVENTION

This invention relates to a facsimile machine capable of communicating with a host device.

A conventional facsimile machine capable of communicating with a host device, such as a host computer, can be set in a "printing mode" or a "transfer mode", and is configured to be set to one of the modes at the initial setting. In the printing mode, received signals including image data from the telephone line is demodulated by a modem, then the coded image data output from the modem is stored in an image memory. The stored image memory is later decoded by an image processing section, and recorded on recording paper by a recording section. On the other hand, in the transfer mode, the image data is transmitted from the image memory to the host device via an interface section.

When the transfer mode is selected at the initial setting, and if the host computer is not switched on, or the facsimile machine and the host computer are not connected by a cable, or if the host computer is not in a state in which it can receive the image data from the facsimile machine because it is busy in performing jobs on other applications, the facsimile machine will not respond to the calling facsimile machine or the printing mode is selected (the operating mode is switched to the printing mode) automatically, to receive the data.

In a conventional facsimile machine, if the transfer mode is selected at the initial setting and if the facsimile machine receives the image data from the telephone line in the state in which the host device cannot receive image data, the facsimile machine executes the receiving operation in the printing mode. This causes a problem that the host device cannot perform intended or desired processing on the data, such as conversion and display, and the data must be transmitted again after the host device becomes able to receive the image data for the desired processing.

SUMMARY OF THE INVENTION

This invention has been conceived to overcome the above problems. It aims to provide a facsimile machine enabling a host device to process the received image data, even if the facsimile machine receives the image data in a state in which the host device cannot receive the image data. For this purpose, the facsimile machine has an internal image memory to store the image data that has been received from the telephone line, and supplies the stored image when the host device restores the state in which it can receive image data.

DETAILED DESCRIPTION OF THE PREFERRED EMBODIMENTS

An embodiment of the invention will now be described with reference to the drawings.

Figure 1:
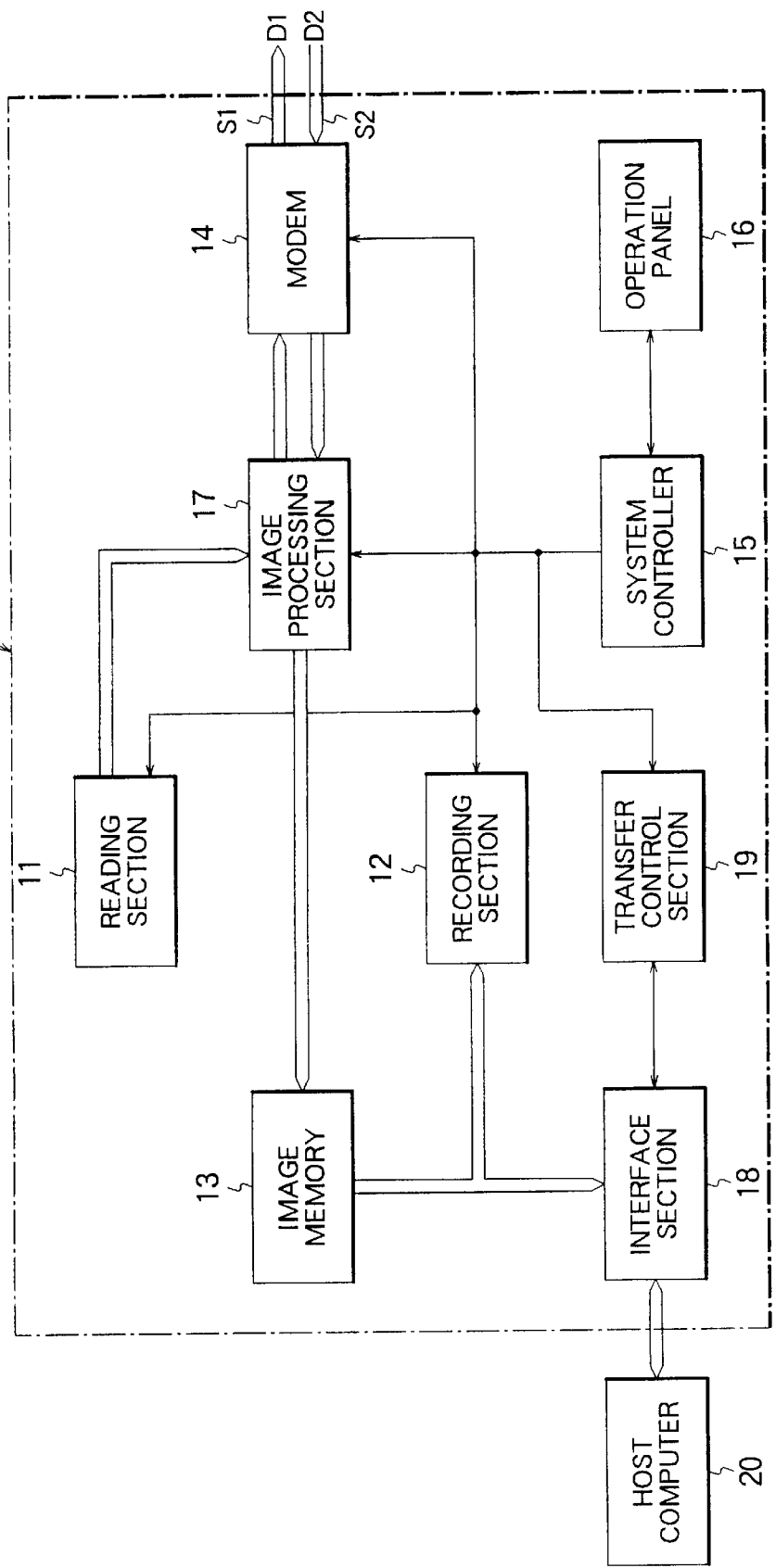
FIG. 1 is a block diagram showing the configuration of a facsimile machine in an embodiment of the invention.

FIG. 1 is a block diagram showing the configuration of a facsimile machine according to an embodiment of the invention. Referring to FIG. 1, the facsimile machine 10 includes a reading section 11 for reading documents, and a recording section 12 for recording received image on recording paper.

An image processing section 17 is connected to the reading section 11. A modem 14 is connected to the image processing section 17. Signals D1 for transmission, including image data S1, and received signal D2 including image data S2 is input to and output from the modem 14.

The image processing section 17 encodes the image data read by the reading section 11 into one-dimensional or two dimensional data and converts the image size, according to the performance of the called facsimile machine (the facsimile machine to which the image data is to be sent). The image processing section 17 also writes the encoded received image data S2 in the image memory 13. The modem 14 modulates the image data S1 to produce signals for transmission, which are then transmitted. The modem 14 also demodulates received signal D2 to produce received image data S2.

An interface section 18 exchanges commands, messages and responses with a host computer 20, and reads image data from the image memory 13, and transmits the image data to the host computer 20.

A transfer control section 19 is connected to the interface section 18, judges whether or not the host computer 20 is in a state in which it can receive image data, and controls image data transfer via the interface section 18 to and from the host computer 20. The control of the transmission and/or reception is based on standards such as RS-232C, IEEE-1284, etc.

The reading section it, the recording section 12, the image processing section 17, the transfer control section 19, and the modem 14 are connected to a system controller 15. The system controller 15 is connected to an operation panel 16 by which key-input operations are performed. The system controller 15 controls the entire facsimile machine including the reading section 11, the recording section 12, the image processing section 17, the transfer control unit 19, the modem 14, and the operation panel 16. The system controller 15 is formed of a central processing unit (CPU), or the like.

Figure 2:
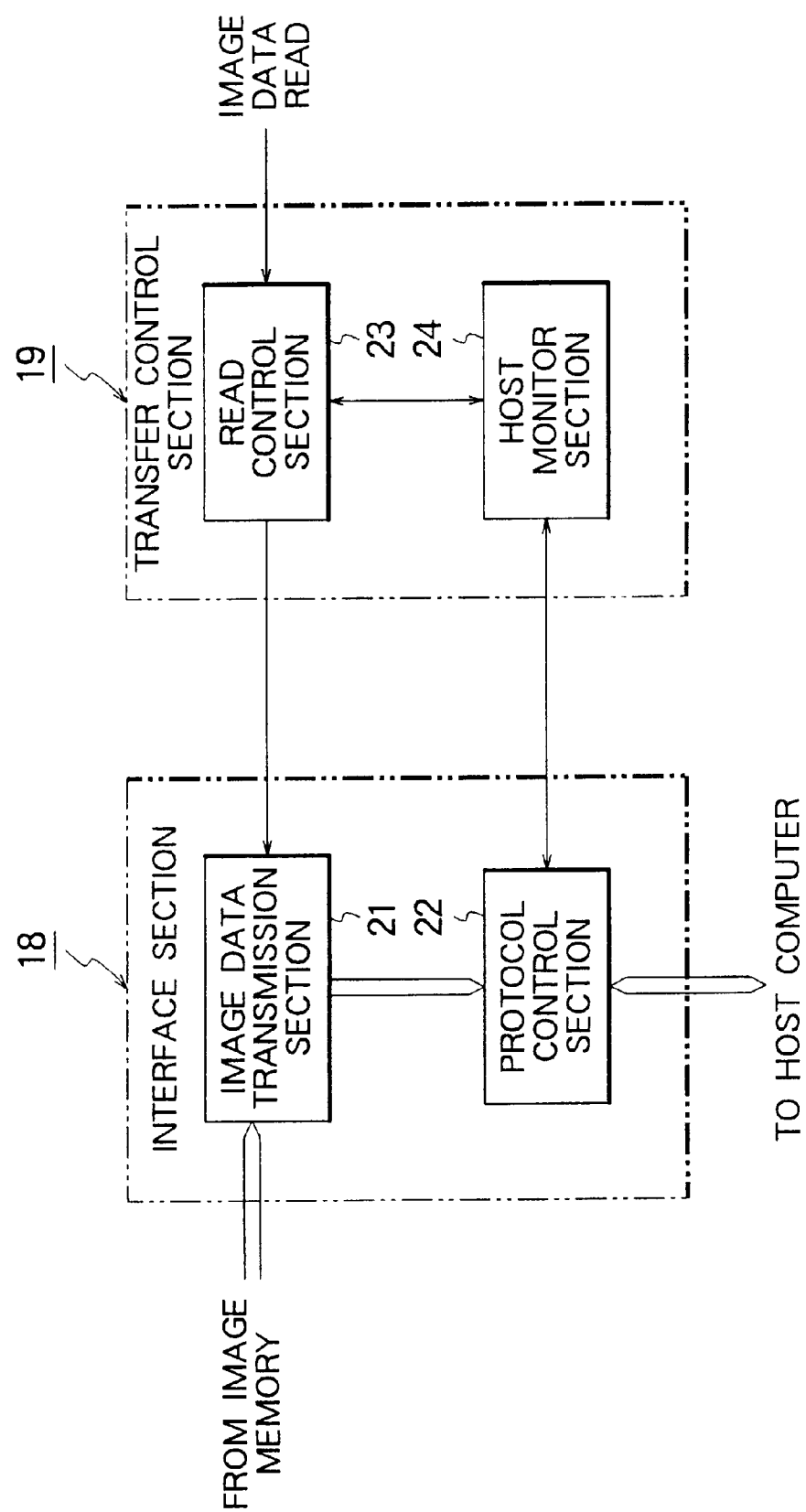
FIG. 2 is a detailed block diagram showing the pertinent part of a facsimile machine in the embodiment of the invention.

FIG. 2 is a block diagram showing the details of the transfer control section 19 and the interface section 18. An image data transmission section 21 reads the image data from the image memory 13 under control by a read control section 23, converts the image data into a format suitable for transfer to the host computer 20, and transfers the converted image data to a protocol control section 22. The protocol control section 22 transfers the image data via a transfer port to the host computer 20.

The protocol control section 22 is connected to a host monitor section 24, and exchanges commands, messages and responses with the host computer 20, under the control by the host monitor section 24. The host monitor section 24 analyzes the contents of the commands, messages and/or responses from the host computer 20, judges whether or not the host computer 20 can receive the image data, and controls the read control section 23 and the protocol control section 22 according to the result of the judgment.

Like the conventional facsimile machine described earlier, the facsimile machine of this embodiment can operate in a transfer mode or in a printing mode. The operation in the printing mode is similar to that of the conventional facsimile machine. The facsimile machine of this embodiment is featured by the operation in the transfer mode.

Figure 3:
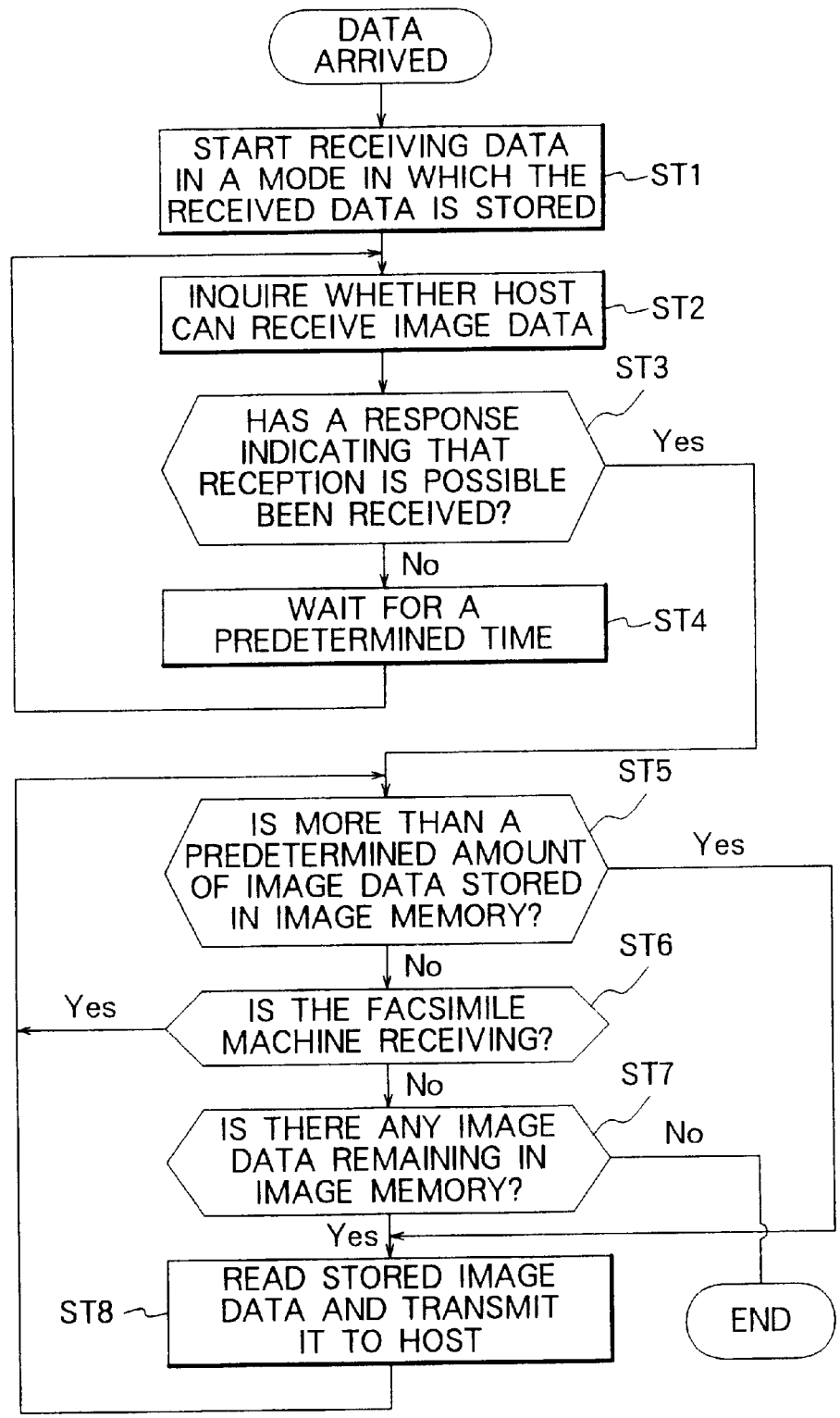
FIG. 3 is a flow chart for explaining the operation of facsimile machine according to the embodiment of the invention.

The operation in the transfer mode will be explained with reference to FIG. 3. In step ST1, when signal D2 including the image data S2 is received by the modem 14, the reception starts in a mode in which the received image data S2 is stored in the image memory 13. The received signal D2 is demodulated by the modem 14 and image data S2 is thereby produced. The received image data S2 is then stored in image memory 13. These operations continue until the completion of the reception, regardless of whether the image data can or cannot be transferred to the host computer 20.

In step ST2, the system controller 15 inquires via the transfer control section 19 whether the host computer can receive the image data or not. The host monitor section 24 in the transfer control section 19 controls the protocol control section 22 and transmits to the host computer 20 an inquiry as to whether the host computer 20 can receive the image data or not.

In step ST3, if the host monitor section 24 does not receive a response from the host computer 20 within a predetermined time, or has received a response to the effect that the host computer 20 cannot receive the image data, the next step performed is step ST4. If the host monitor section 24 has received a response to the effect that the host computer 20 can receive the image data, then the next step performed is step ST5.

In step ST4, the host monitor section 24 returns to step ST2 after a predetermined waiting time has elapsed.

In step ST5, the host monitor section 24 informs a read control section 23 that the image data transfer to the host computer 20 is possible. The read control section 23 controls the image data transmission section 21 and checks whether at least a predetermined quantity (e.g., 256 bytes) of image data is stored or not in the image memory 13. If the answer is yes, the next step is step ST8; if no, the next step is step ST6.

In step ST6, the system controller 15 checks whether any signal D2 is being received or not. If the answer is yes, the next step is step ST5; if no, the next step is step ST7.

In step ST7, the read control section 23 checks whether there is still the image data 13 remaining in the image memory 13 or not. If the answer is yes, the next step is step ST8; if no, the operation ends.

In step ST8, the image data transmission section 21 is controlled by the read control section 23 to read the image data from the image memory 13. It then converts the data into a format suitable for transfer to the host computer 20 and transmits it to the host computer 20 via the protocol control section 22.

In the above description, the inquiry as to whether the host computer 20 can receive image data is repeated indefinitely, i.e., without any limitation as to the number of repetitions of the inquiry, or the time for which the inquiry is repeated. The arrangement may alternatively be such that if the answer from the host computer 20 indicates that it cannot receive the data, or no answer is received despite repeated inquiries from the facsimile machine or despite expiration of a certain period (of a few days, for example) after the first inquiry, the system controller 15 may issue instructions to cause the image data in the image memory 13 to be read, and printed by the recording section 12, and to cause the image data in the image memory 13 to be erased.

Figure 4:
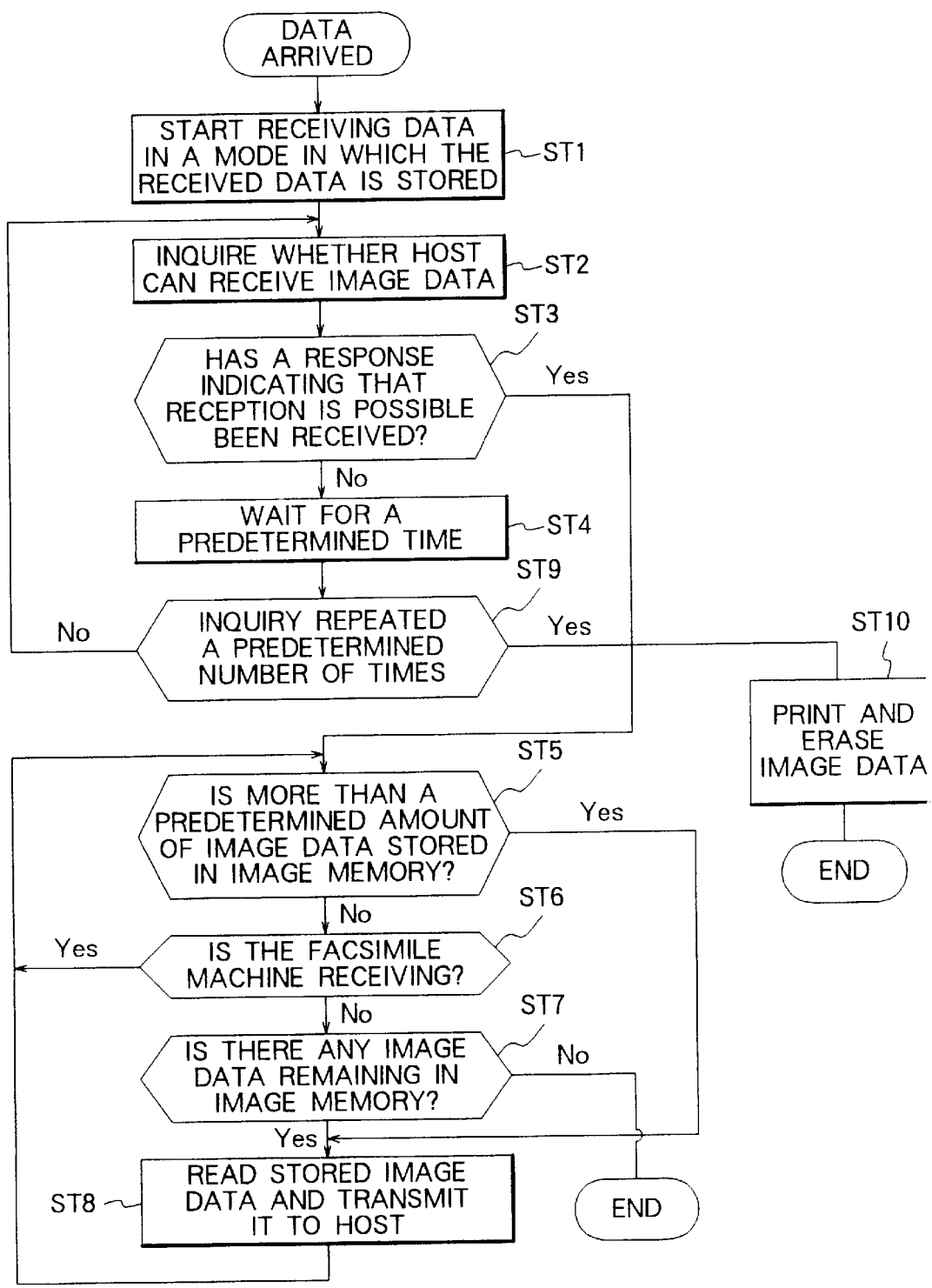
FIG. 4 is a flow chart for explaining the operation of facsimile machine according to another embodiment of the invention.

This can be implemented by an algorithm shown in FIG. 4. The algorithm shown in FIG. 4 is similar to that shown in FIG. 3. The difference is the addition of the steps ST9 and ST10. In the step ST9, judgment is made as to whether the same inquiry has been issued a predetermined number of times. If the answer is "Yes" the next step is the step ST10 where the image data stored in the image memory is printed, and the image data having been printed is erased from the image memory. If the answer at the step S9 is "No", the next step performed is the step ST2.

Instead of the judgment as to whether the same inquiry has been issued a predetermined number of times, judgment as to whether a predetermined time has passed after the first inquiry may be made.

If the above-mentioned "certain period" is three days long, or the number of repetitions is so determined that the inquiry is repeated for about three days, it is possible to keep the image data in the image memory 13 even if the host computer 20 continues to be in the state in which it cannot receive data throughout the weekend.

In such case, the host computer 20 may be made into a state in which it can receive data, and then the image data stored in the image memory may be transferred to the host computer 20. In this way, the loss of the image data can be avoided even if the state in which the transfer is not possible lasts for a certain period (over the weekend, for example). At the same time, by the provision of the function of printing in the event that the state in which the transfer is; not possible Lasts for more than the certain period, the image data stored in the image memory is printed and is erased. This makes it unnecessary to use a memory with an unacceptably large capacity.

If the inquiry is made at a substantially regular interval, terminating the inquiry after repeating it a predetermined number of times is substantially equivalent to terminating the inquiry upon expiration of a predetermined time.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A facsimile machine which can be connected for use in combination with a computer, comprising:

an image memory for storing received image data;

an interface section for transferring stored image data from said image memory to a computer to which said facsimile machine is connected;

a transfer control section for controlling transfer of said stored image data to said computer;

wherein when the computer is not in a state in which it can receive image data, said transfer control section causes said image data to be stored in said image memory, and after confirming that the computer has become able to receive image data, said transfer control section causes the stored image data to be transferred to said computer; and a system controller;

wherein said facsimile machine is capable of operating in a transfer mode or in a printing mode, and when the image data is received from a line while the facsimile machine is in the transfer mode, and if the computer continues to be in a state in which it cannot receive image data for predetermined period, or the computer does not respond to a predetermined number of repeated inquires, said system controller causes the stored image data in the image memory to be printed and erased from the image memory.

2. A method of processing image data received by a facsimile machine which is used in combination with a computer, comprising the steps of:

(a) checking, when facsimile image data is received, whether the computer is in a state in which it can receive image data;

(b) storing the facsimile image data, if the computer is not in a state in which it can receive image data, in an image memory in the facsimile machine;

(c) checking again after expiration of a predetermined time after the computer is not found to be in a state in which it can receive image data, whether the computer has entered a state in which it can receive image data;

(d) when the computer is in a state in which it can receive image data, transferring the facsimile image data having been stored, to the computer;

(e) printing the facsimile image data in the image memory if:

the facsimile image data is received from a line while the facsimile machine is in a transfer mode, and if the computer continues to be in a state in which it cannot receive image data for predetermined period, or the computer does not respond to a predetermined number of repeated inquires; and (f) erasing the facsimile image data from the image memory.

* * * * *